United States Patent
Haas et al.

(10) Patent No.: US 10,890,435 B2
(45) Date of Patent: Jan. 12, 2021

(54) DEVICE FOR MEASURING THE GEOMETRY OF THE INNER WALL OF BORES AND CORRESPONDING METHOD

(71) Applicant: MICRO-EPSILON MESSTECHNIK GMBH & CO. KG, Ortenburg (DE)

(72) Inventors: Juergen Haas, Ortenburg (DE); Alexander Streicher, Mauth (DE); Bernhard Jochum, Haarbach (DE); Guenter Schallmoser, Ruhstorf (DE)

(73) Assignee: MICRO-EPSILON MESSTECHNIK GMBH & CO. KG, Ortenburg (DE)

(*) Notice: Subject to any disclaimer, the term of this patent is extended or adjusted under 35 U.S.C. 154(b) by 26 days.

(21) Appl. No.: 16/304,657

(22) PCT Filed: Sep. 14, 2016

(86) PCT No.: PCT/DE2016/200430
§ 371 (c)(1),
(2) Date: Nov. 26, 2018

(87) PCT Pub. No.: WO2017/202399
PCT Pub. Date: Nov. 30, 2017

(65) Prior Publication Data
US 2019/0271536 A1    Sep. 5, 2019

(30) Foreign Application Priority Data
May 24, 2016  (DE) .................. 10 2016 208 949

(51) Int. Cl.
*G01B 11/12* (2006.01)
*G01B 11/24* (2006.01)
(Continued)

(52) U.S. Cl.
CPC .............. *G01B 11/12* (2013.01); *G01B 11/24* (2013.01); *G01B 21/14* (2013.01); *G01B 21/20* (2013.01); *G01N 21/954* (2013.01)

(58) Field of Classification Search
CPC ..... G01B 11/12; G01B 11/24; G01B 11/2425; G01B 21/14; G01B 21/20; G01N 21/954;
(Continued)

(56) References Cited

U.S. PATENT DOCUMENTS

| 5,317,387 A * | 5/1994 | Van Hengel | G01N 21/88 |
| | | | 356/446 |
| 2004/0051520 A1* | 3/2004 | Jagiella | G01B 7/142 |
| | | | 324/207.11 |

(Continued)

FOREIGN PATENT DOCUMENTS

| DE | 3923401 A1 | 1/1991 |
| DE | 102008040921 A1 | 2/2010 |

(Continued)

*Primary Examiner* — Michael A Lyons
(74) *Attorney, Agent, or Firm* — Jason P. Mueller; FisherBroyles, LLP

(57) ABSTRACT

A device is disclosed for measuring the geometry of the inner wall of bores, drill holes and passages, which are optionally countersunk, and in particular for threaded, pin, and rivet connections of workpieces, said device comprising at least one optical sensor measuring towards the inner wall and capable of being introduced into the drill hole and rotated via a feed/rotating unit, wherein an auxiliary object is provided with a passage and rests on the surface of the workpiece, through which passage said sensor is inserted into the countersink and/or bore. The device is characterized in that the inner wall of the auxiliary object is provided with a structure and that the sensor scans said structure(s) while passing through the auxiliary object. The disclosure also relates to a corresponding method.

10 Claims, 12 Drawing Sheets

(51) Int. Cl.
*G01B 21/20* (2006.01)
*G01B 21/14* (2006.01)
*G01N 21/954* (2006.01)

(58) Field of Classification Search
CPC ... G01N 2021/9542; G01N 2021/9544; G01N 2021/9548; E21B 47/082
See application file for complete search history.

(56) References Cited

U.S. PATENT DOCUMENTS

| | | | |
|---|---|---|---|
| 2011/0001984 A1* | 1/2011 | Keller | G02B 13/06 |
| | | | 356/612 |
| 2011/0080588 A1* | 4/2011 | Segall | G01N 21/954 |
| | | | 356/445 |
| 2011/0247409 A1 | 10/2011 | Stamenkovic | |
| 2016/0187265 A1* | 6/2016 | Rudolf | G01B 9/02 |
| | | | 356/496 |
| 2016/0327775 A1* | 11/2016 | Esteban Finck | G01B 11/24 |
| 2017/0097306 A1* | 4/2017 | Ullrich | G01N 21/8806 |
| 2018/0156738 A1* | 6/2018 | Wagner | G01B 11/306 |

FOREIGN PATENT DOCUMENTS

| | | |
|---|---|---|
| EP | 1754018 A1 | 2/2007 |
| EP | 1797813 A1 | 6/2007 |
| JP | 2013195412 A | 9/2013 |
| WO | 2005/121700 A1 | 12/2005 |
| WO | 2007/139768 A2 | 12/2007 |

* cited by examiner

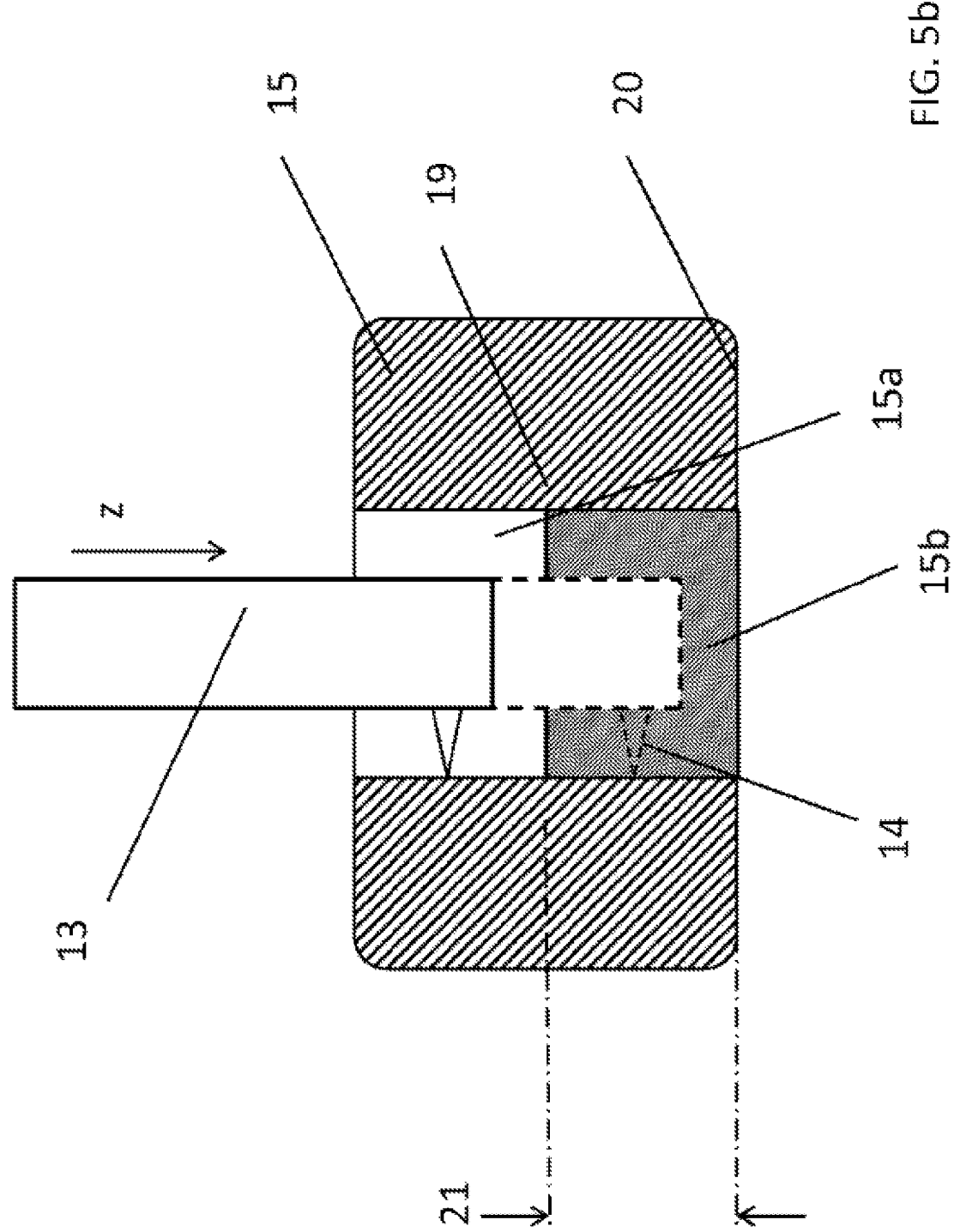

DEVICE FOR MEASURING THE GEOMETRY OF THE INNER WALL OF BORES AND CORRESPONDING METHOD

CROSS-REFERENCE TO RELATED APPLICATIONS

This application is a 371 of international patent application number PCT/DE2016/200430, filed Sep. 14, 2016, which claims priority to German patent application number 102016208949.8, filed May 24, 2016, the entire contents of each of which are incorporated herein by reference.

BRIEF DESCRIPTION OF THE DRAWINGS

FIG. 5b shows a schematic view of an exemplary embodiment of another auxiliary object of a device according to an embodiment.

DETAILED DESCRIPTION

Figure 1:
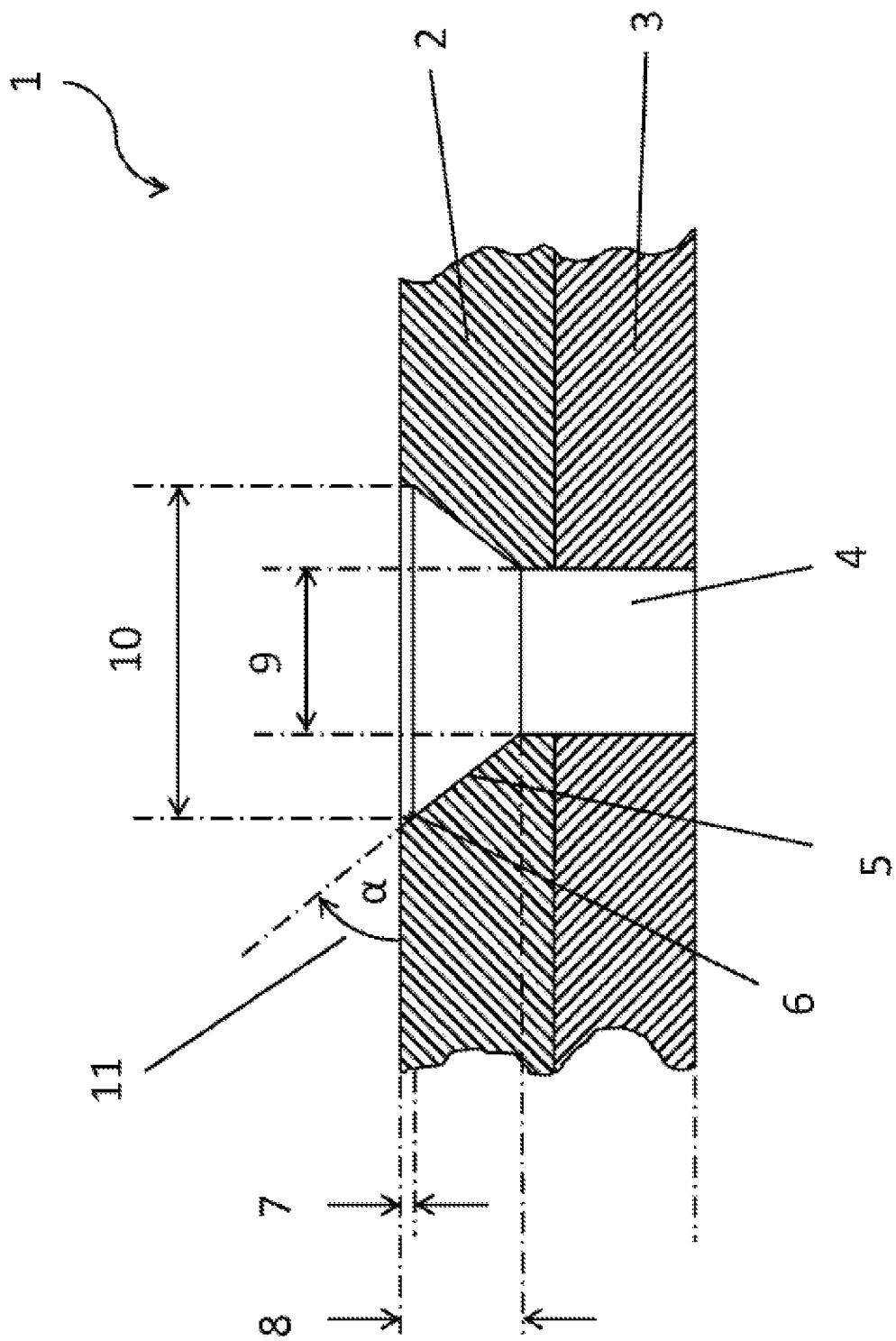
FIG. 1 shows a schematic view of the number of geometric ratios in the connection of two workpieces.

This disclosure relates to a device for measuring the geometry of the inner wall of bores, drill holes and passages, which are optionally countersunk, and in particular for threaded, pin, and rivet connections of workpieces, said device comprising at least one optical sensor measuring towards the inner wall and capable of being introduced into the drill hole and rotated via a feed/rotating unit, wherein an auxiliary object is provided with a passage and rests on the surface of the workpiece, through which passage said sensor is inserted into the countersink and/or bore.

Furthermore, the disclosure relates to a method for measuring the geometry of the inner wall of bores, drill holes and passages, which are optionally countersunk, and in particular for threaded, pin, and rivet connections of workpieces, wherein at least one optical sensor measuring towards the inner wall is capable of being introduced into the drill hole and rotated via a feed/rotating unit, wherein an auxiliary object is provided with a passage and rests on the surface of the workpiece, through which passage said sensor is inserted into the countersink and/or bore.

With regard to the generic features, it is noted that this pertains to measuring the inner wall of bores, drill holes and passages, which may be countersunk or not. As far as bores are discussed therein, the term shall be understood as synonym for any material recesses. Ultimately, the measuring refers to an optical scan of the inner wall in the present context.

In many areas of manufacturing, measuring bores or drill holes is gaining in significance. The inner diameter of bores for threaded, pin, and rivet connections critically affects the later strength of the connection since an unadjusted diameter or an inaccurately measured depth of the bore may result either in the inability to introduce the screw, pin, or rivet (the bore is too small) or to properly hold the screw, pin, or rivet (the bore is too big). With regard to countersunk screws and rivets, the screw or rivet head is also supposed to be flush and not protrude. In particular safety-relevant threaded and rivet connections, for example in the automobile or aircraft industry, require thus an accurate measuring of the geometry of the bore prior to the threading or riveting operation.

Aircraft construction further requires that the rivet be flush with the outer shell of the aircraft, in order to avoid air turbulences that will lead to higher fuel consumption.

Different techniques are known in the field for measuring the geometry of bores. For example, one or several distance sensors can determine the diameter by introducing the distance sensor into the drill hole using a suitable support. The sensor measures laterally the distance to the inner wall of the bore. By rotating the sensor with its support, the inner diameter can be determined over the entire circumference. Frequently, two or more sensors are used. They either determine the diameter only in a few places (without rotation), or they measure faster because no full rotation is needed. If, during the measuring, the support of the sensor is moved axially towards the bore, the inner surface of the bore can be scanned and its geometry measured.

Different techniques for measuring the distance are known in the field. Simple distance-scanning sensors (measuring probes) require a large construction space and are thus only suitable for large bores. Furthermore, they contact the surface, which may result in damaging the workpiece. For this reason, non-contact measuring techniques are used, for example capacitive or optical techniques.

The disadvantage of capacitive measuring is the relatively large size of the measurement spot, which only allows achieving a rough averaged value. Optical measurement techniques are thus preferred. Particularly suitable are laser distance sensors or confocal chromatic sensors that allow for an almost point-shaped measurement, making it possible to determine the geometry of the bore with high spatial resolution.

An exemplary measuring of bores with confocal chromatic sensors is known from EP 1 754 018 A1. Using a suitable beam deflection (mirror or prism), the measuring beam of the sensor is projected laterally onto the inner wall of the bore. By rotating the sensor, the inner wall of the bore is scanned. An advantage of optical methods consists in the very small size and compact configuration of the probe head, while the light is conducted via a light guide into the probe head and deflected there. The remaining components of the sensor (light source, spectrometer, evaluation unit, etc.) may be disposed outside the bore. With such an arrangement, bores may be measured up to the sub-millimeter region.

In prior art, simple cylindrical bores can be measured easily. However, if the bores are countersunk in order to avoid any protrusion of the screw or rivet head, as may be the case for threaded or rivet connections, prior art fails. Threaded or rivet connections are often used to connect two or more workpieces, with countersink in case a screw or rivet head needs to be countersunk.

Optical distance sensors are usually specified if the surface is arranged at a right angle or perpendicular to the measuring beam. The stronger the tilt of the surface to the measuring direction, the greater the measuring errors that may occur. This also complicates determining the geometry of the countersink. Edges are another issue. Since the measuring spot has a certain size, in the transition over an edge, the measuring spot is located partially on one side of the edge and partially on the other, which may result in undefined measurement results. This applies to countersinks on the upper edge (towards the surface of the workpiece as well as at the transition from countersink into bore. Frequently, this also prevents determining the exact value of the depth of the countersink, because its starting point and its transition into the bore cannot be measured with sufficient accuracy. Consequently, the depth of the bore cannot be determined accurately since this measurement also depends on an exact determination of the upper edge of the countersink.

Another disadvantage of measuring countersinks using high-precision optical sensors, in particular confocal chromatic sensors, is their small measuring range. The starting point of the countersink may be located outside the measuring range, preventing determination of the starting point (transition countersink—workpiece surface). This makes it also impossible to measure the depth or determine the length of the countersink.

An attempt to solve such issues in the field involved using an auxiliary object, the auxiliary object being mechanically connected with the sensor. The known auxiliary object is configured in form of a sleeve or a ring and mounted on the workpiece by means of a spring. Mounting the auxiliary object on the workpiece defines a clear position that can be referenced when measuring the countersink/bore. The inner diameter of the auxiliary object is selected such that it lies within the measurement range of the sensor. When mounting the measuring arrangement on the workpiece, first the auxiliary object is mounted on the workpiece. The sensor senses the inner diameter of the auxiliary object. As the sensor is fed towards the bore, the edge of the auxiliary object is reached and recognized by the sensor. If the auxiliary object rests fully on the workpiece, the edge of the auxiliary object correlates with the upper edge of the countersink. Based on this zero point, the length of the countersink, the edge of the transition to the bore and optionally the depth of the bore may be determined.

But even when using an auxiliary object, additional problems may arise, as described in the follow.

The edge of the auxiliary object cannot be determined exactly, since edges can often not be detected with sufficient accuracy by optical sensors. It is of particular disadvantage when the diameter of the countersink is located on the surface of the workpiece outside the measuring range of the sensor, since the sensor is then "looking into the infinite" on the edge. Frequently, distortions or excessive noise occur at this location, which prevents obtaining a clear, valid reading for the edge. Often, it is not possible to manufacture a sufficiently well-defined edge using mechanical processing.

By centering the measuring device, or if the diameter of the countersink corresponds approximately to the diameter of the auxiliary object, the distance measured to the auxiliary object and to the workpiece is approximately equal, which makes it difficult to differentiate and determine the edge exactly.

In view of the foregoing, the disclosure is aimed at configuring and enhancing a device for measuring the geometry of the inner wall of bores, drill holes and passages, which are optionally countersunk, in a manner that provides highly accurate and precise measurement results. The device is also simple to assemble. Furthermore, a corresponding method for application of the device according to an embodiment is disclosed.

The above issue is solved by the device according to an embodiment and the features recited in the claims, pursuant to which the device is characterized in that the inner wall of the auxiliary object is provided with a structure and that the sensor scans said structure(s) While passing through the auxiliary object.

With regard to the method according to an embodiment, the above issue is solved by the features recited in the claims, wherein the generic method is characterized in that the inner wall of the auxiliary object is provided with a structure and that the sensor scans said structure(s) while passing through the auxiliary object and transition points, in particular differences in brightness, material, and/or surface finish, but also corners, edges, etc. are determined by fitting curves, for example straight lines, circular arcs, or other shapes that are geometrically easy to describe, to the readings and by subsequently calculating their intersections, wherein the intersections define the transition points.

It is not mandatory to only employ distance-based methods. Alternatively or additionally, other features, such as brightness, gloss level, color, material, and/or surface finish may be used in an analog manner. State transitions can be sensed by the sensor and their position can be evaluated subsequently. A different intensity signal from the surface may for example be achieved by using different materials with distinguishable brightness levels or differing light diffusion, but also by applying markings such as lines, circles, checkerboard patterns, or other markings on the surface, for example with a laser, through coating or post-processing. As with the geometric features, the end of the auxiliary object can be inferred by means of the sensed intensity signal from the detected transitions. The stabilization is then typically achieved by averaging several such transitions instead of one geometric fit. Furthermore, if a sufficient number of transitions are present, plausibility measures may also be used to reject potentially misrecognized transitions early on. It is not necessary to manufacture the features employed with absolute precision. It suffices if the sensor measures the auxiliary object in a calibration step. Distance-based and brightness-based methods may be combined to further improve the accuracy of the results.

The device according to an embodiment works as follows.

The measuring device is mounted in an axial direction on the countersink/bore. The sensor within the measuring device moves towards the countersink/bore and measures the distance to the inside of the auxiliary object.

The shape of the auxiliary object may be chosen as appropriate. Rotational symmetrical forms are advantageous because they can be easily produced by rotation. The auxiliary object has one or more defined structures on the inside that are scanned by the distance sensor while passing through. The distance of the structure in the axial direction to the edge of the auxiliary object is known or determined by measurement. The distance may be known by precise manufacturing of the structure using CNC data.

In lieu of precise manufacturing of an auxiliary object, structure and exact position of said auxiliary object may also be determined after manufacturing by means of measurement and calibration.

The distance sensor is used to sense the structure dependent on feed, e.g. in z direction. For example, the readings provided by the distance sensor during the feed motion can be recorded and stored dependent on readings of a reference sensor. This will yield value pairs of the distance sensor dependent on the z direction. The same applies to the other sensed features such as brightness. By comparison with a standard, the absolute position and orientation of the structure and the edge of the auxiliary object can be determined from the readings of the distance sensor. Once the structure is determined as described below, the exact position of the edge will be known as well. The knowledge of the distance from the structure to the edge allows the exact definition of the position of the edge in the axial direction. Therefore, the position of the edge of the auxiliary object and thus the upper edge of the countersink are known when mounting the auxiliary object.

There are different possibilities with regard to the configuration of the structure, as described in the following The structure may be a step in the inner bore of the auxiliary object. It is advantageous if the inner diameter of the auxiliary object on each side of the step is selected such that the measuring range of the distance sensor is not exceeded. This prevents the distance sensor from "looking into the infinite." This way, valid readings are generated on each side of the step which allows for a very accurate determination of the axial position. If additional steps, each with a differing inner diameter, or transitions in the surface finish are added, the measuring accuracy may be increased, since certain statistics (averaging, plausibility test) can be carried out.

It is particularly advantageous if the structure comprises a ramp or slope. In a rotational symmetrical arrangement, the structure then corresponds to a cone. While this makes determining the edge more difficult, since the transition is not a sharp step and measuring towards sloped surfaces is generally unfavorable, this disadvantage can be balanced by fitting a straight line through multiple measurement points. First, readings are recorded during the feed motion along the constant inner diameter. Due to noise or other measurement errors, measuring the inner diameter tends to be inaccurate. Using the readings, a straight line may be fitted in a known manner, which makes it possible to determine an exact value for the inner diameter. As the feed motion continues, further readings are recorded along the sloped surface. Again, a straight line is fitted in an analog manner. The transition is determined by the intersection of the two straight lines. The intersection can be determined with high accuracy since the straight lines contain already averaged readings. This allows simply and effectively compensation for signal dropouts or distortions that tend to occur at the transition points between straight pieces and sloped pieces or on the edges of the auxiliary object or bore. The slope is to be defined such that the sensor is still generating enough valid readings while the intersection can be determined mathematically with sufficient accuracy.

This possibility may be expanded further, for example by incorporating a new straight piece with a constant inner diameter in the auxiliary object after the first slope. It is also possible to use a combination of multiple slopes and straight pieces. This allows fitting more straight lines, the intersections of which can be determined with high accuracy, which increases the overall accuracy of determining the edge.

By fitting straight lines into the piecewise straight portions (slope, inner diameter, countersink), the intersection(s) can be determined exactly, for instance using mathematical methods, or by evaluation carried out by a computer. In a very general form, the structure may comprise any geometrical shapes, such as circular arcs. The readings would then have to be fitted in a suitable manner, for instance by polynomial interpolation or by spline interpolation.

In the same manner as for the auxiliary object, the contour of the bore, the countersink, or the shoulder is determined by fitting curves to the readings. This allows determining the geometric features of the bore/countersink. In particular at transition points it becomes possible to determine the exact position because the characteristic features are determined exactly by mathematical methods (fitting, calculation of intersections, etc.) rather than referencing sensor signals affected by noise or dropouts.

There are different possibilities to configure and enhance the teaching of the disclosure in an advantageous manner, which arise on the one hand from the claims subordinate to claim 1, and on the other hand from the following description of preferred exemplary embodiments of the disclosure with reference to the drawings. In association with the description of the referred exemplary embodiments of the disclosure with reference to the drawings, the generally preferred configurations and enhancements of the teaching will also be described. In the drawings, FIG. 1 shows the geometric ratios 1 in the connection of two workpieces 2, 3. Said bore 4 has a countersink 5 to prevent the screw or rivet head from extending beyond the workpiece surface. On the upper edge of said countersink 5, a small shoulder 6 may be disposed. Numerous geometric features may be measured: the depth of shoulder 7 or countersink 8, the diameter of shoulder 10 or bore 9, the angle α 11 of the countersink, or the total thickness of the two connected workpieces. It is necessary to verify the readings to avoid the screws or rivets installed in the subsequent threading or riveting process protruding above the surface or sitting too deep in the drill hole. These criteria are essential for the stability and durability of the threaded or rivet connection.

Figure 2:
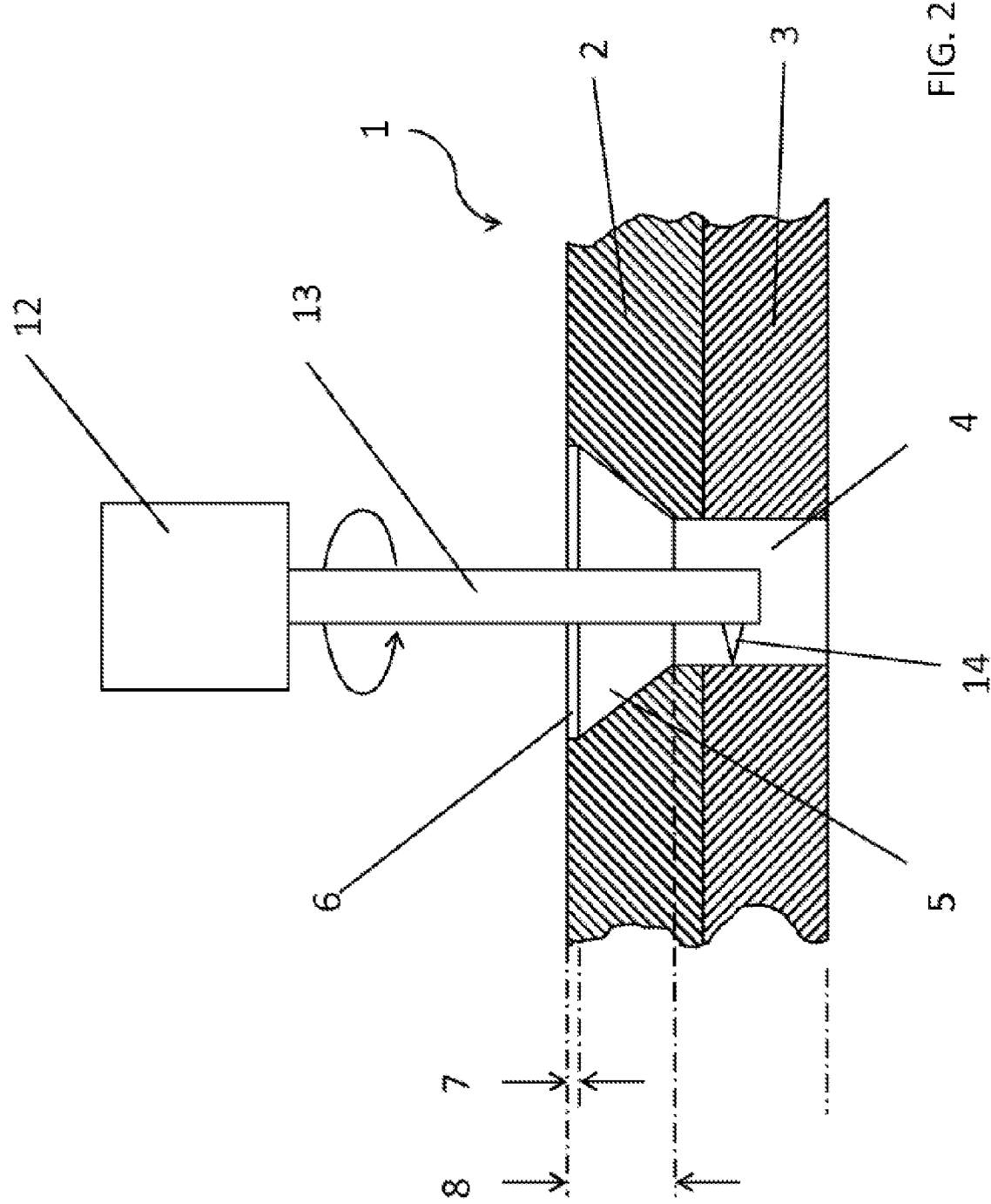
FIG. 2 shows a schematic view of a measuring operation using a prior art optical sensor.

FIG. 2 shows the measuring process for the inner diameter 9 of bore 4. A measuring device 12 includes a sensor 13, which is introduced via a feed/rotating unit (not shown for the sake of convenience) into the drill hole and rotated therein. With one or more rotations of sensor 13, the inner diameter 9 of bore 4 can be measured by scanning with the measuring beam 14. Using the feed unit, this can take place at several depth positions of the bore 4.

Figure 3:
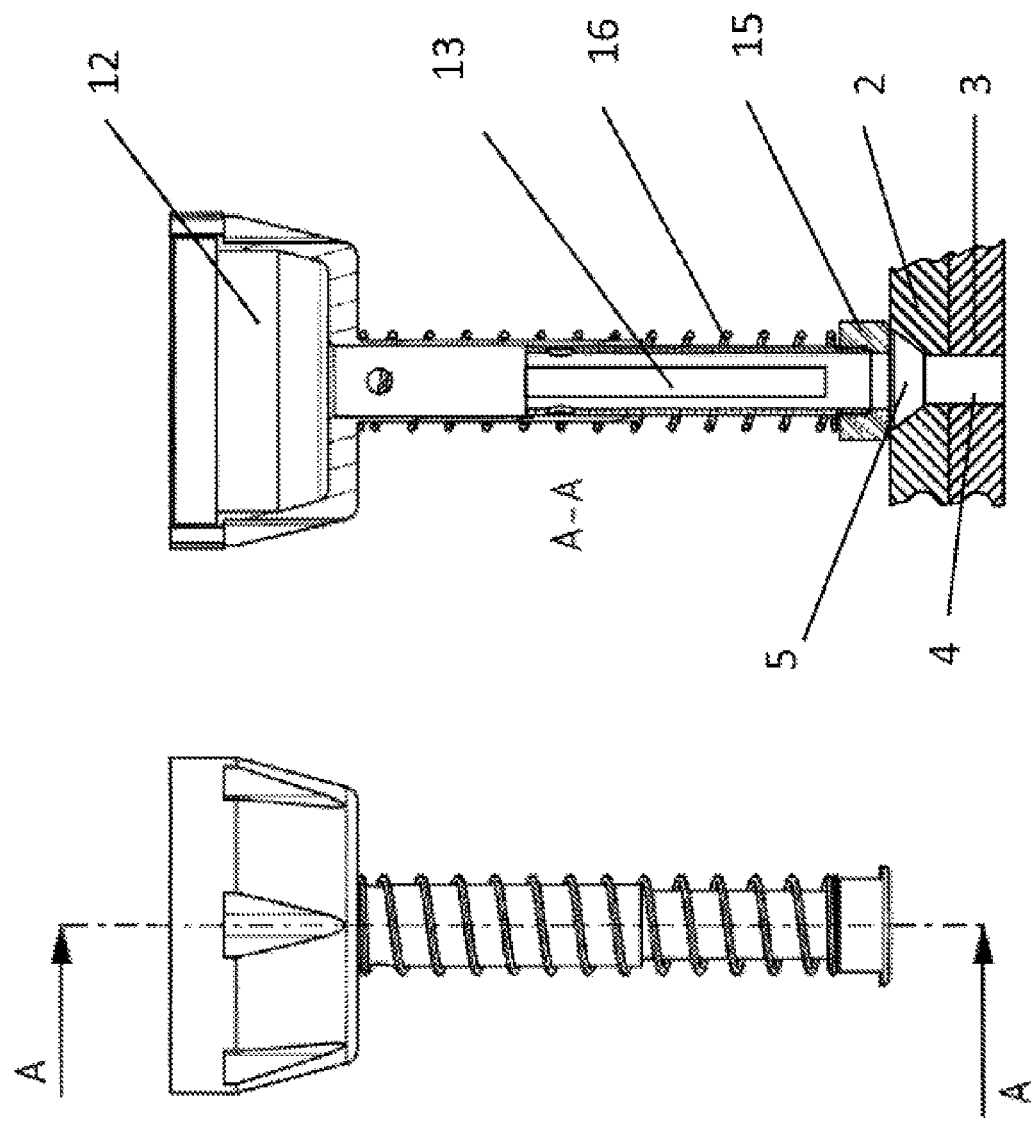
FIG. 3 shows a schematic view of a specific configuration/arrangement of a measuring device with auxiliary object.

FIG. 3 shows the measuring device 12 with sensor 13 and an auxiliary object 15, which is pushed against the surface of the workpiece 2 during the feed of the measurement device 12 by means of a spring 16. Sensor 13 is then inserted through the auxiliary object 15 into the countersink 5 or bore 4. During the teed movement, the profile of the auxiliary object 15 as well as the profiles of the shoulder 6 and the countersink 5 are recorded.

Figure 4:
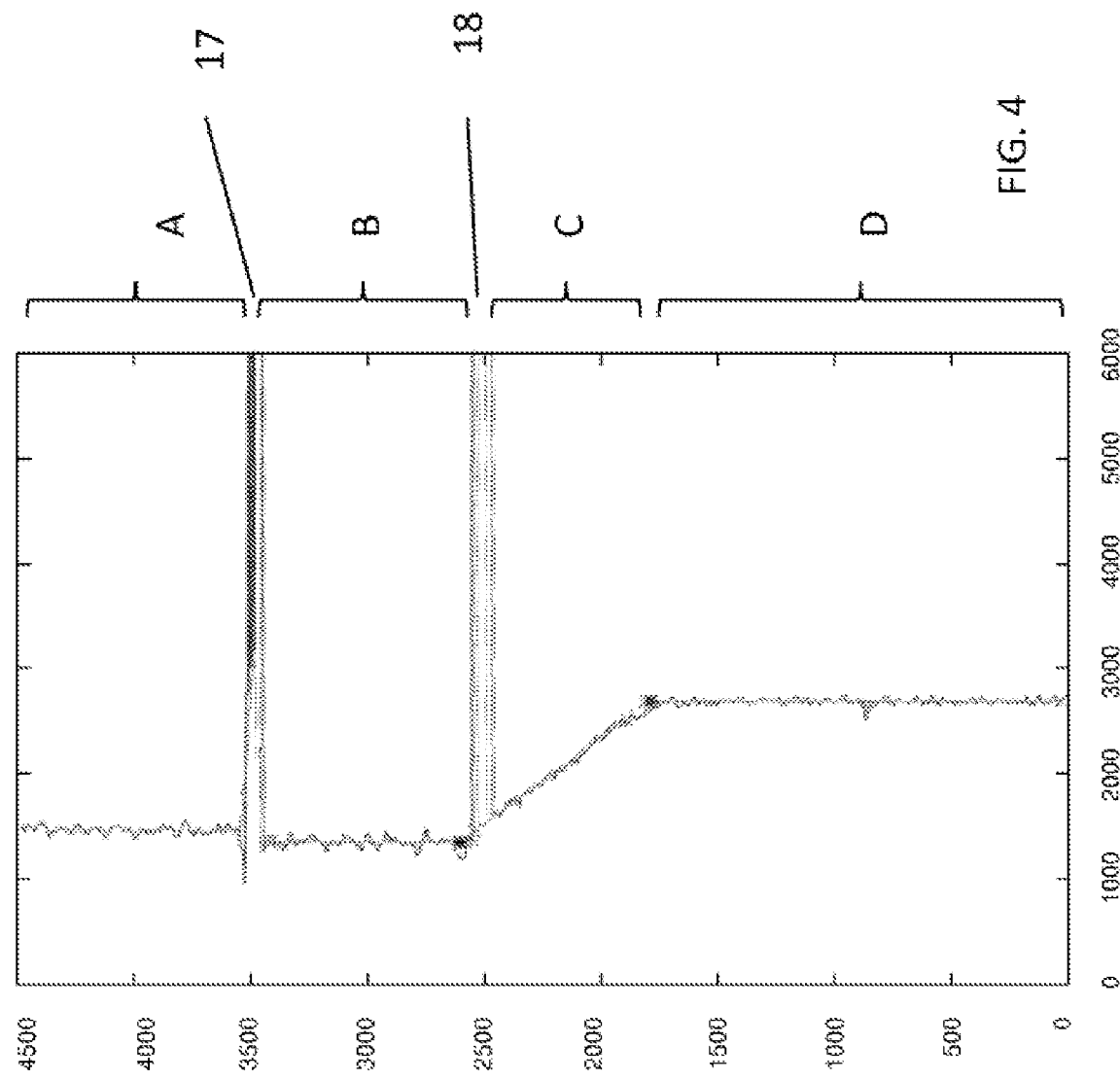
FIG. 4 shows a diagram of a profile of the measurement in accordance with the measuring device in FIG. 3.

FIG. 4 shows the profile of the measurement in FIG. 3. Zone A depicts the inner contour of the auxiliary object 15. Zone B corresponds to the shoulder 6, zone C to the countersink 5, and zone D to the bore 4. The distortions of the readings are clearly visible at the transition between A and B (transition 17, edge of the auxiliary object to the upper edge of the workpiece) as well as B and C (transition 18 from shoulder 6 to countersink 5). These readings cannot be referenced for an exact determination of the position of the edge or of the transition.

Figure 5A:
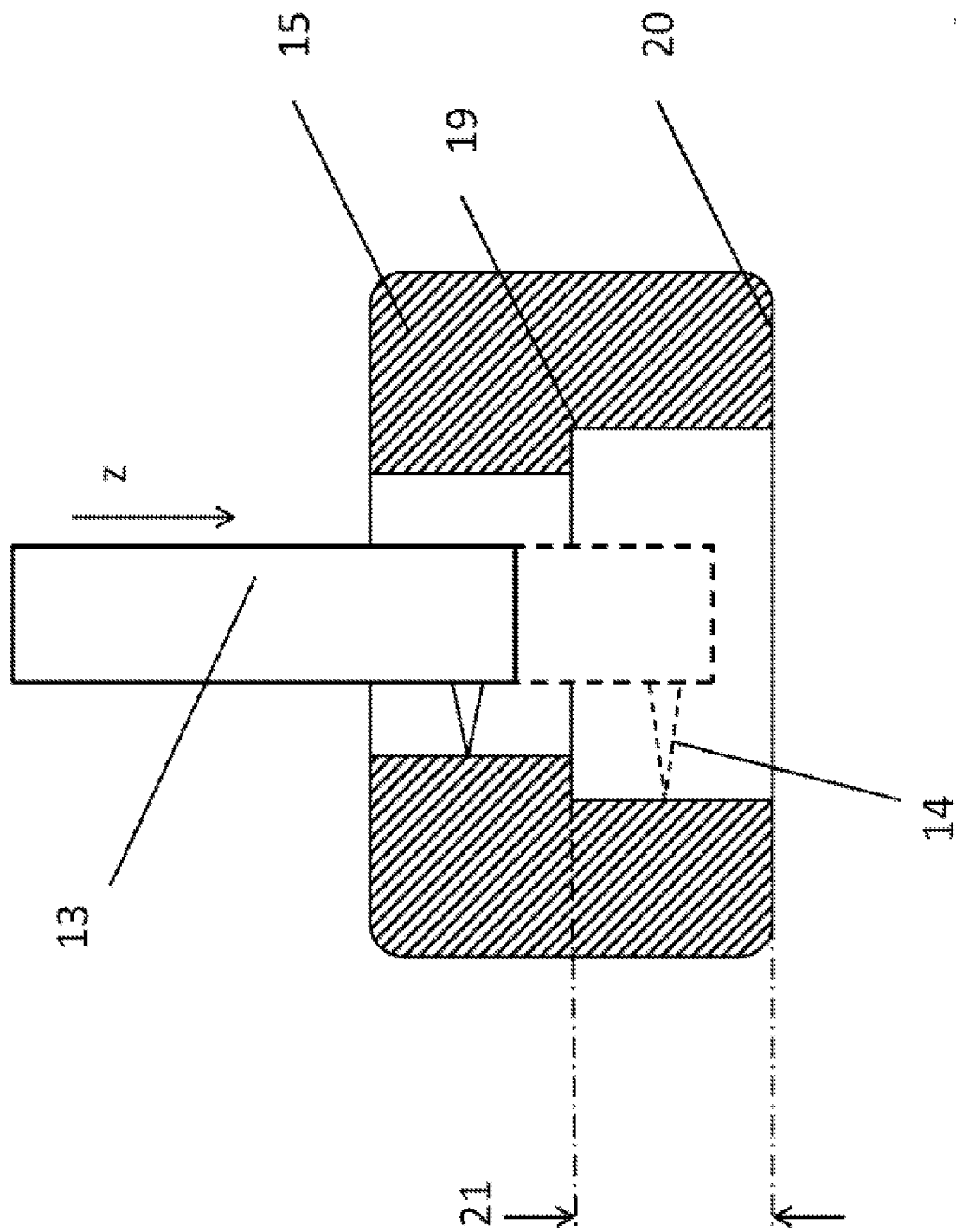
FIG. 5a shows a schematic view of an exemplary embodiment of an auxiliary object of a device according to an embodiment.

FIG. 5a shows an exemplary configuration of the auxiliary object 15. On the inside of the auxiliary object, a step 19 is machined, for example by means of rotation. The edge of said step 19 has a known distance 21 to the edge of the auxiliary object 20. The inner diameter 9 after said step towards the edge is selected as to not to exceed the measuring range of sensor 13. The measuring beam 14 thus delivers valid readings.

FIG. 5b shows another exemplary configuration of the auxiliary object 15. On the inside of the auxiliary object 15, the structure of the surface shows a change in texture. Here, a change of brightness is depicted. In the upper part 15a, the inner surface is bright, in the lower part 15b on the other hand, it is dark. The change takes place at location 19, so that said location has a known distance 21 to the edge of the auxiliary object 15. The sensor 13 recognizes the change in surface finish on the edge 19, for example by evaluating the intensity signal. Likewise, other structures may be affixed to the inside, for instance color changes or changes in gloss level. This is shown by way of example in FIG. 5c.

Figure 5C:
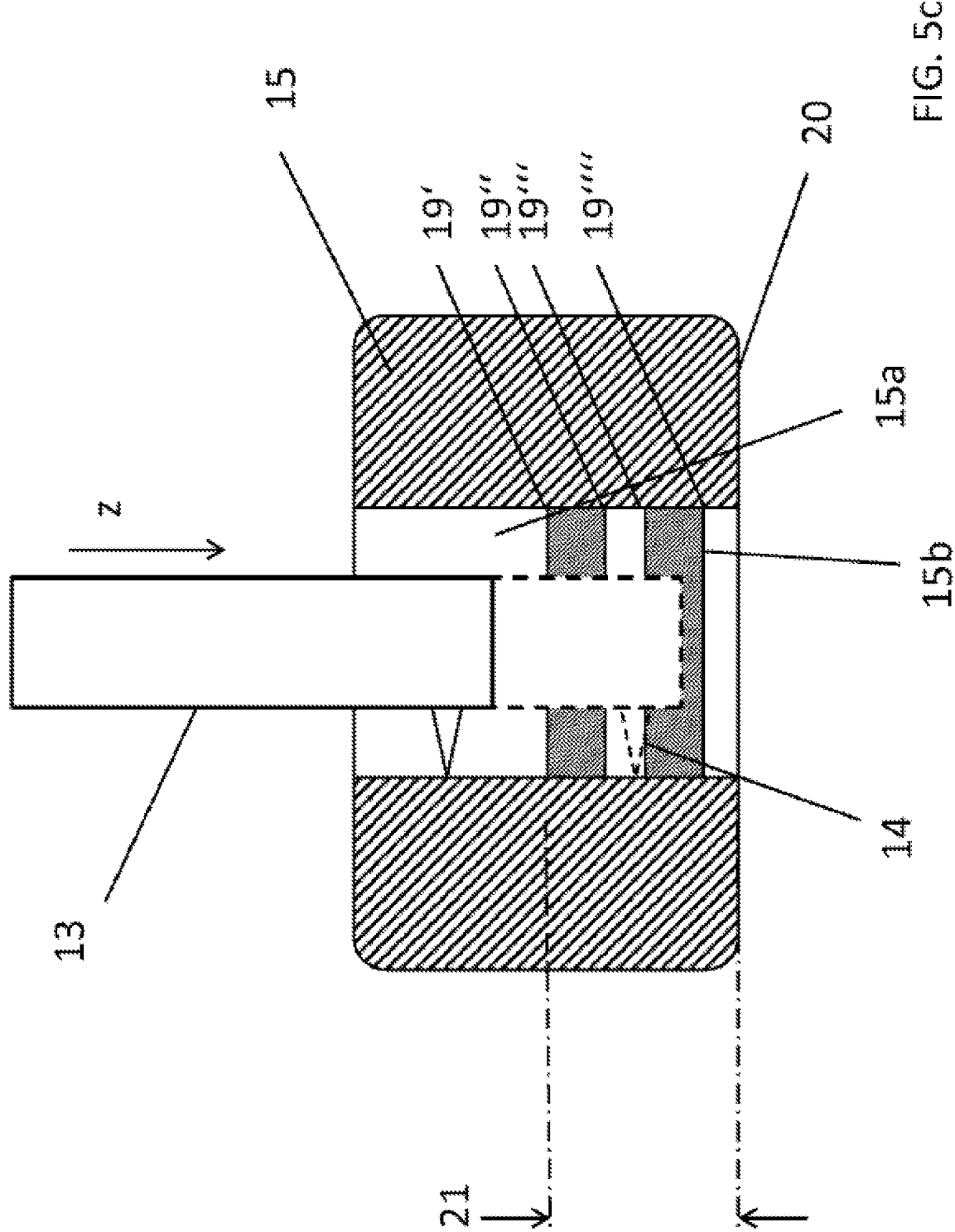
FIG. 5c shows a schematic view of an exemplary embodiment of another auxiliary object of a device according to an embodiment.

According to FIG. 5c, the inner surface of the auxiliary object 15 is structured by color (upper part 15a, lower part 15b) with changing light-dark-transitions between the parts. The distance to the edge 20 of the auxiliary object 15 may be determined from the known position of the transitions 19', 19'', 19''', 19''''.

Figure 6:
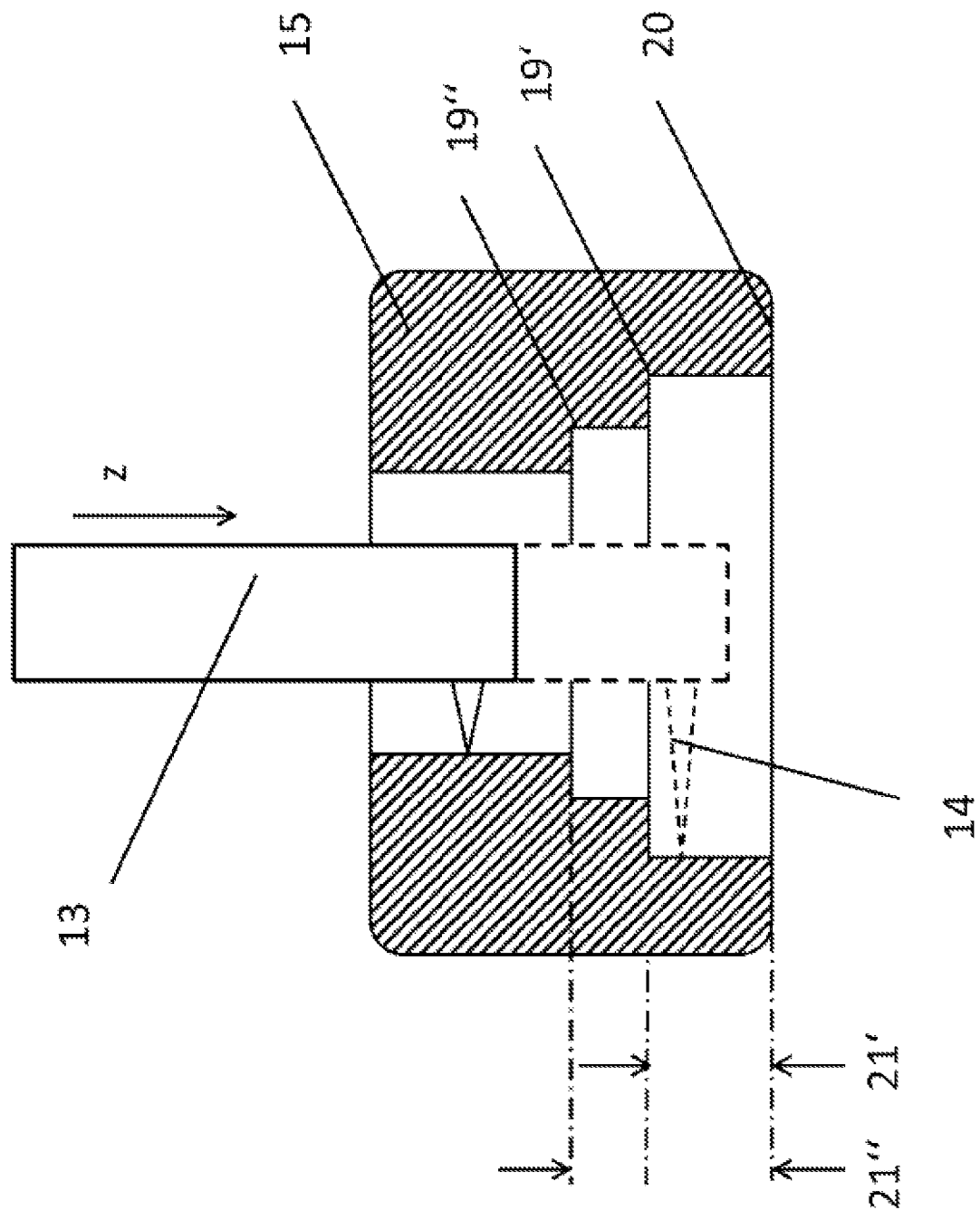
FIG. 6 shows a schematic view of an exemplary embodiment of another auxiliary object of a device according to an embodiment.

FIG. 6 shows another exemplary configuration of the auxiliary object 15. On the inside of the auxiliary object, two steps 19', 19'' are machined. The edge of the first step (19') has a known distance 21' to the edge 20 of the auxiliary object 15, the edge of the second step 19'' has a known distance 21'' to the edge of the auxiliary object.

Figure 7:
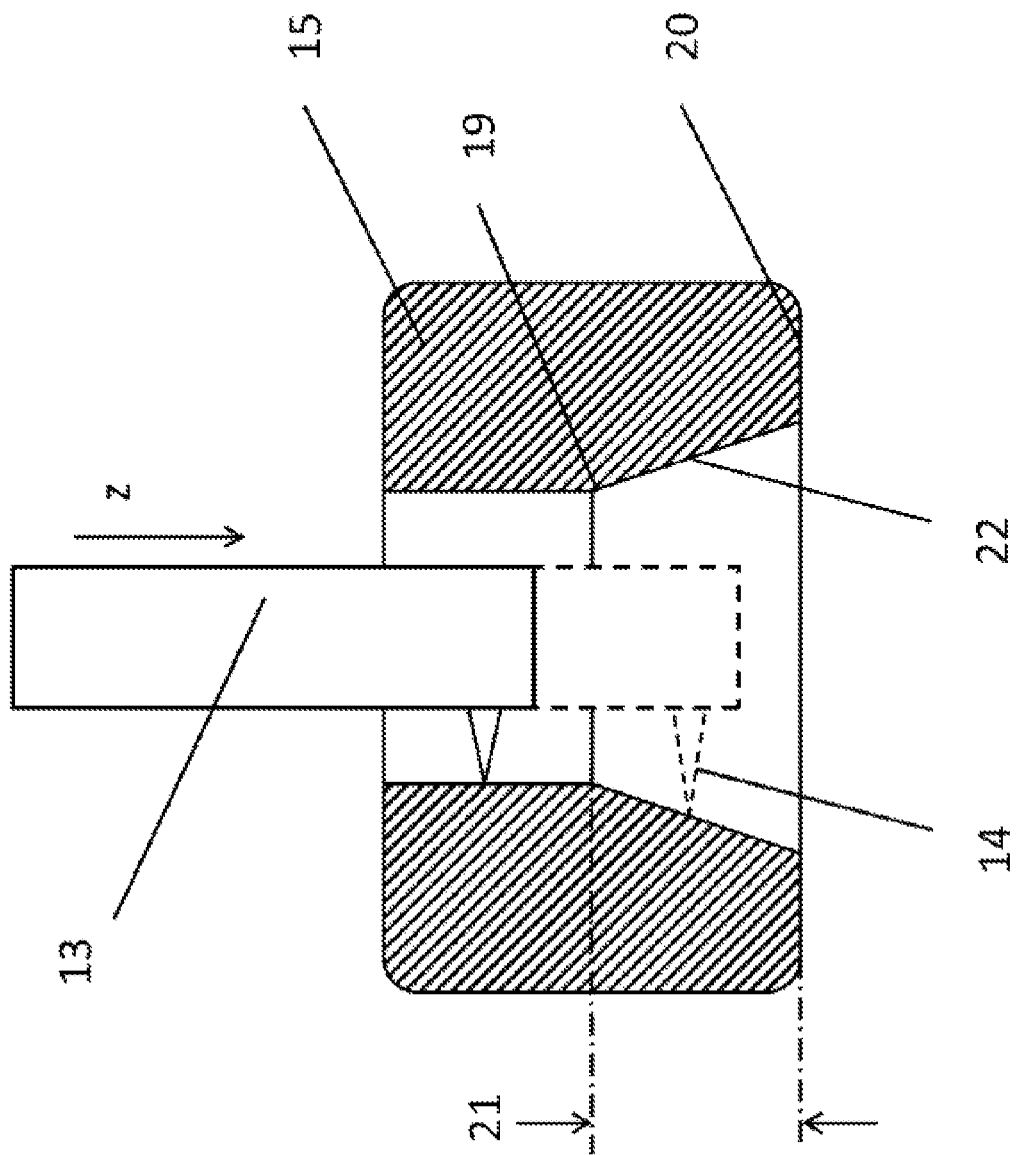
FIG. 7 shows a schematic view of an exemplary embodiment of another auxiliary object of a device according to an embodiment.

FIG. 7 shows another exemplary configuration of the auxiliary object 15. On the inside of the auxiliary object, a slope (cone) 22 is machined, for example by rotation. The edge 19 of the transition to said cone 22 has a known distance 21 to the edge of the auxiliary object 20.

Figure 8:
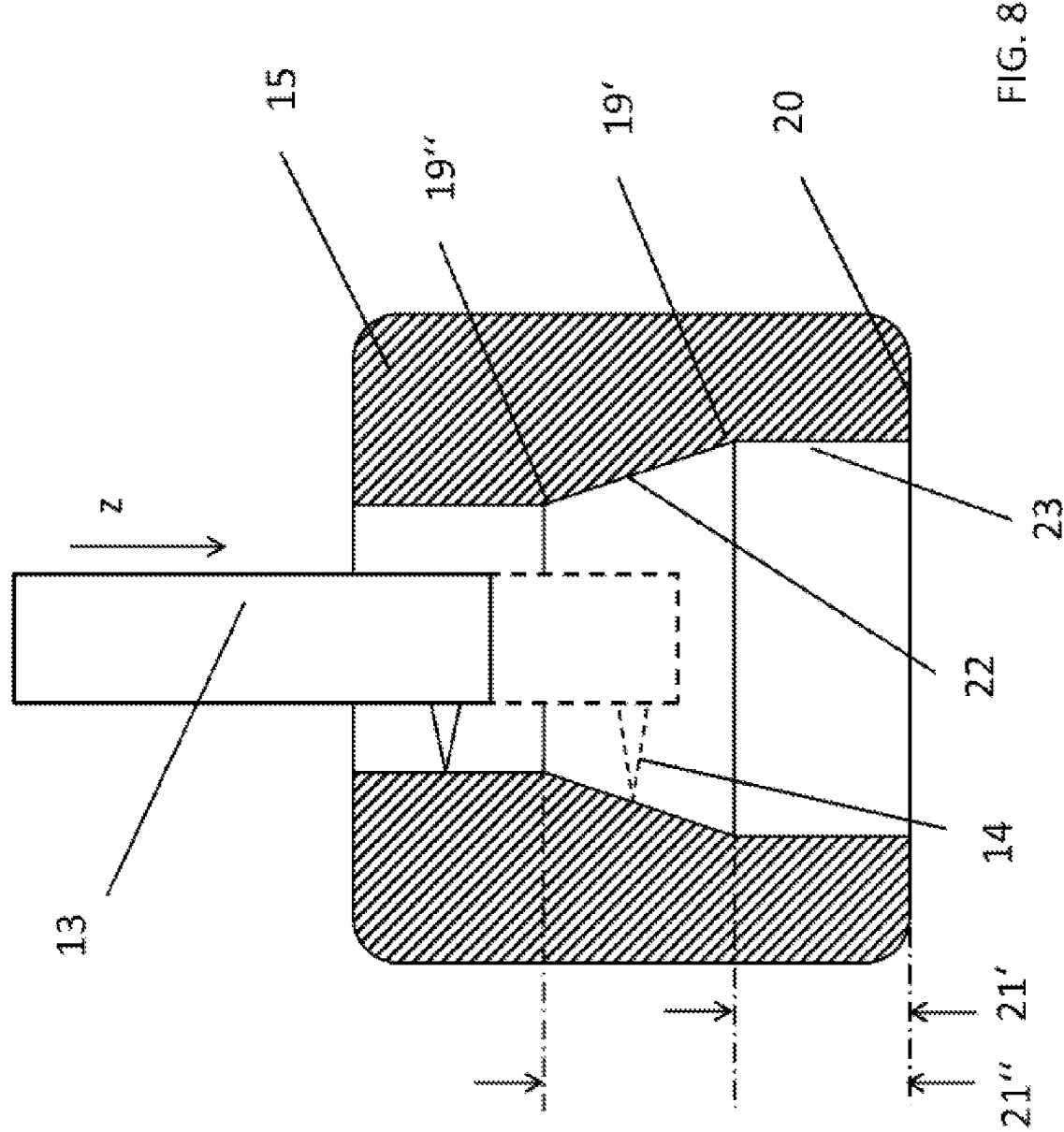
FIG. 8 shows a schematic view of an exemplary embodiment of another auxiliary object of a device according to an embodiment.

FIG. 8 shows another exemplary configuration of the auxiliary object IS. On the inside of the auxiliary object, a slope (cone) 22 is machined, for example by rotation, which adjoins again an area with a constant diameter 23. The first edge 19' of the transition to the cone 22 has a known distance to the edge 20 of the auxiliary object 15, the second edge 19'' of the transition has a second known distance 21'' to the edge of the auxiliary object. By piecewise fitting straight lines to the readings, one obtains two intersections 19', 19'' that can be determined with high accuracy.

Figure 9:
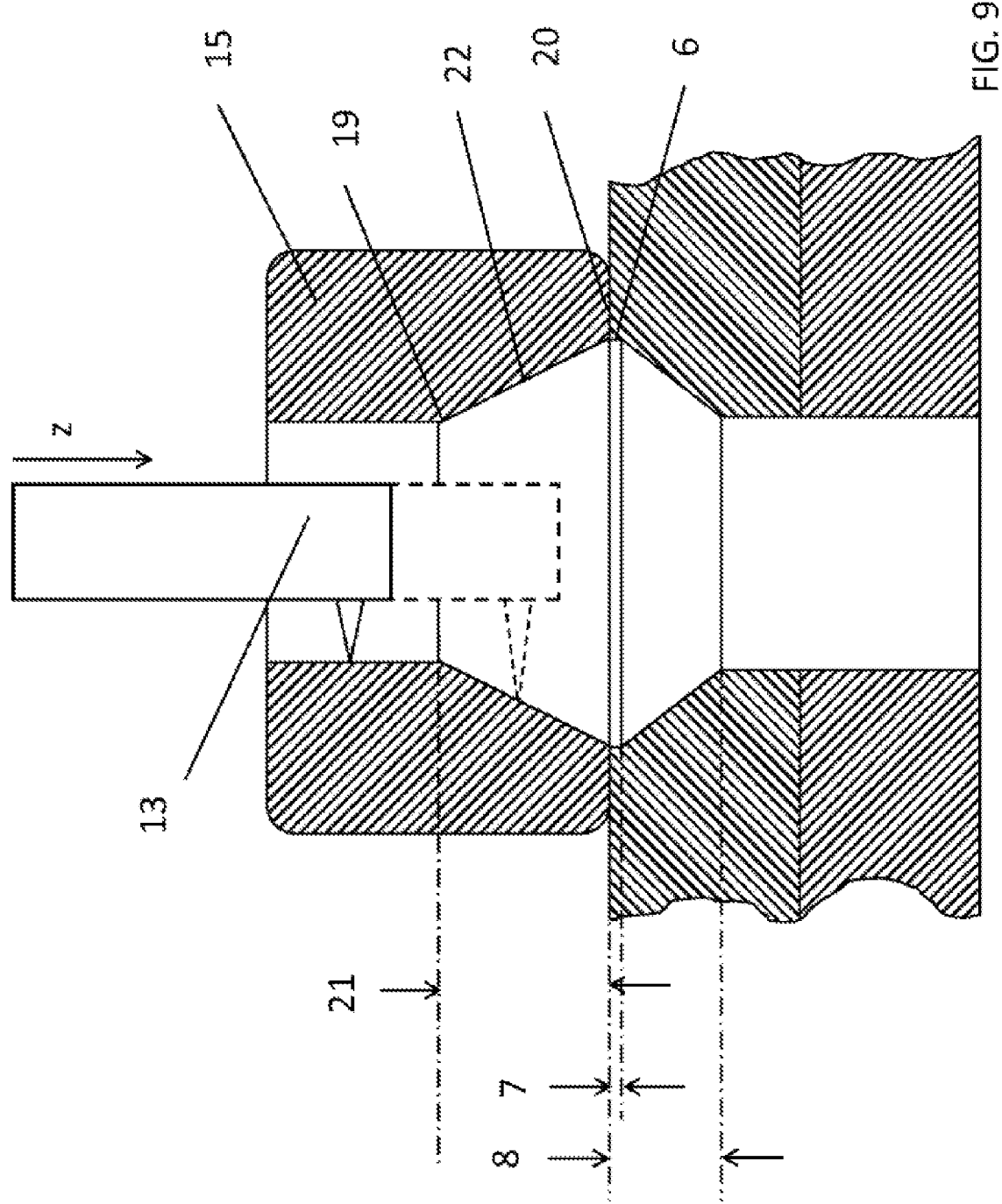
FIG. 9 shows a schematic view of the measuring device over the course of a feed of the sensor that moves over the edge of the cone prior to introduction into the bore.

FIG. 9 shows the measuring arrangement over the course of feeding the sensor 13 over the edge of the cone prior to introduction into the bore. In this unfavorable case, the diameter of the shoulder 6 is about the same size as the diameter of the slope 22 on the edge of the auxiliary object. When the sensor 13 passes, the detection on the edge 20 of the auxiliary object would be made difficult or even impossible. By fitting straight lines into the piecewise straight portions (slope, interior diameter, countersink), the intersection and thus the start point of the measured object can be determined exactly.

Figure 10:
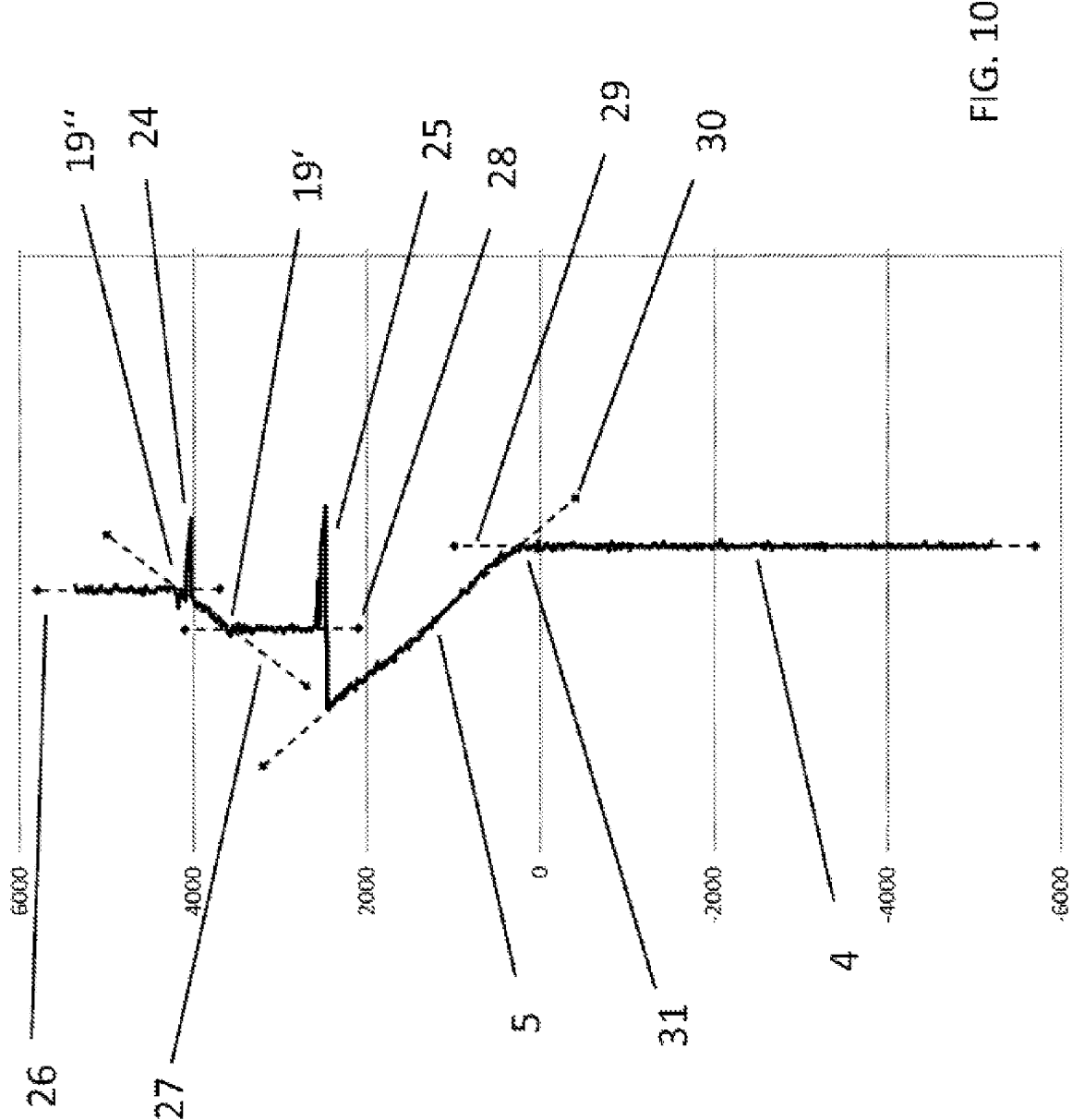
FIG. 10 shows a diagram of the profile of the measurement in accordance with the measuring device in FIG. 9.

FIG. 10 shows an exemplary result of a measurement while the sensor is fed into the bore. Noise can be seen in the measuring signal, resulting, on the one hand, from surface properties of the auxiliary object or the bore/countersink, and on the other hand within the sensor itself. The signal dropout or distortion is particularly clear in the transition points between straight pieces and sloped pieces, for instance at location 24 on the auxiliary object, or at the transition point between auxiliary object and countersink 25.

By the piecewise fitting of straight lines to the measurement points, averaging and smoothing can be achieved. On the readings for the auxiliary object in the upper, straight part, a straight line 26 is fitted, and in the following sloped part a second straight line 27. The intersection of the straight line then provides the exact position of transition point 19''. This allows determining exact intersections, which makes it possible to accurately determine the position of the edge 20. Likewise, the fitting line in the lower cylindrical part of the auxiliary object 28 intersects with the fitting line of the cone part, which defines transition point 19'.

The knowledge of the exact position of the transition points 19', 19'' from the CAD data or by calibration therefore allows determining the exact position of the edge of the auxiliary object. Thus, the exact position of the upper edge of the countersink is also determined when mounting the auxiliary object on the countersink.

The same applies to countersink 5 and bore 4, where straight lines 29, 30 are fitted, the intersection of which establishes the transition point 31 and thus the end of the countersink.

With regard to additional advantageous configurations of the teaching of the disclosure, it is referred to the general part of the description as well as the attached claims in order to avoid repetitions.

Finally, it is noted expressly that the exemplary embodiments of the teaching of the disclosure described above merely serve to illustrate the claimed teaching without limiting it to the exemplary embodiments.

REFERENCE LIST

1 Geometric ratios
2 Workpiece
3 Workpiece
4 Bore
5 Countersink of the bore
6 Shoulder on the upper edge of the countersink
7 Depth of the shoulder
8 Depth of the countersink
9 Diameter of the bore, inner diameter
10 Diameter of the shoulder
11 Angle α
12 Measuring device
13 Sensor
14 Measuring beam
15a Auxiliary object, upper part
15b Auxiliary object, lower part
16 Spring
17 Transition between zone A and zone B
18 Transition between zone B and zone C
19, 19', 19''' Step, edge
20 Edge of the auxiliary object
21, 21', 21'' Distance to the edge of the auxiliary object
22 Slope, cone
23 Zone with constant diameter
24 Location
25 Transition point between auxiliary object and countersink
26 First straight line
27 Second straight line
28 Straight line
29 Straight line
30 Curve, straight line

The invention claimed is:

1. A device configured to measure a geometry of an inner wall of a bore, a drill hole, or a passage, the device comprising:
    at least one optical sensor that is configured to capture optical data of the inner wall of the bore, drill hole, or passage and is configured to be introduced into and rotated within the bore, drill hole, or passage,
    wherein an auxiliary object is provided with a passageway and rests on a surface of a workpiece, the sensor is configured to be inserted through the passageway of the auxiliary object into the bore, drill hole, or passage, wherein the inner wall of the auxiliary object is provided with a structure, and
    wherein the sensor is configured to capture optical data of the structure while passing through the auxiliary object.

2. The device of claim 1, wherein a distance to the structure is known.

3. The device of claim 1, wherein a distance to the structure is determined based on the optical data.

4. The device of claim 1 wherein the structure rotationally symmetrical.

5. The device of claim 1, wherein an axial distance of the structure to edges of the passageway of the auxiliary object is known.

6. The device of claim 1, wherein the structure includes geometrical features.

7. The device of claim 1, wherein the structure includes at least one of corners, edges, shoulders, and differences in brightness, material, and surface finish.

8. The device of claim 6, wherein the structure includes a succession of straight and sloped or angled portions.

9. A method for measuring a geometry of an inner wall of a bore, drill hole, or passage, the method comprising:
    introducing an optical sensor through a passageway of an auxiliary object into the bore, drill hole, or passage, wherein the passageway of the auxiliary object includes a structure having geometric features, and wherein the auxiliary object rests on a workpiece;
    capturing optical data of the structure of the passageway and of the inner wall of the bore, drill hole, or passage while the optical sensor is rotated; and
    determining geometric features including one or more of corners, edges, and differences in brightness, material variations, and surface finish, based on detecting changes in optical data,
    wherein changes in optical data are quantified by fitting position dependent optical data to mathematical functions including one or more of straight lines, circular arcs, or other shapes, and determining transition points to be points of discontinuity in the fitted optical data.

10. The method of claim 9, wherein the position dependent optical data of the structure is approximated by fitting to straight lines, polynomials, or other mathematical functions.

* * * * *